Figure 1:
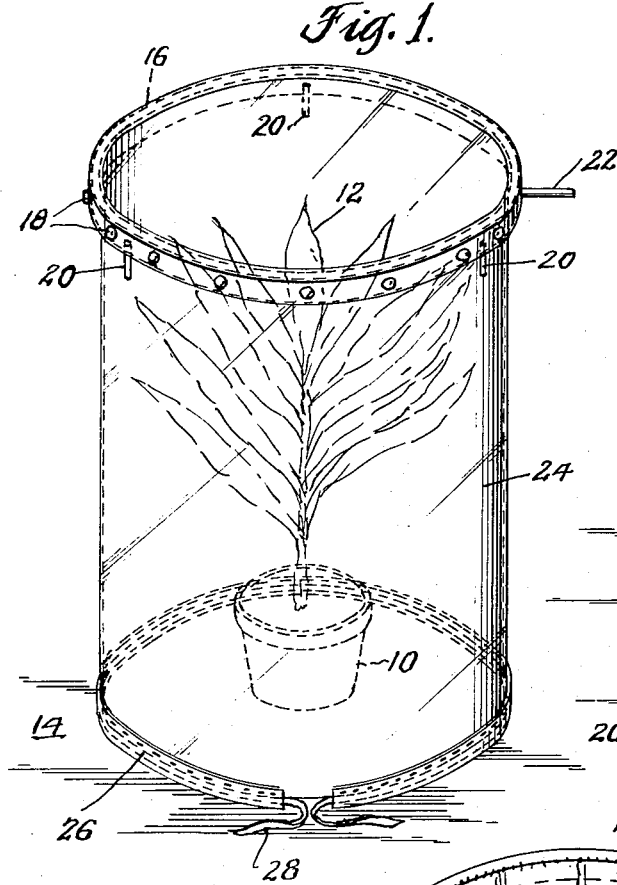

United States Patent
Leitch

[15] 3,681,872
[45] Aug. 8, 1972

[54] PLANT SHOWER CURTAIN ASSEMBLY

[72] Inventor: James F. Leitch, N. 1005 Park Towne Place, 2200 Parkway, Philadelphia, Pa.

[22] Filed: Feb. 26, 1970

[21] Appl. No.: 14,434

[52] U.S. Cl. .......................... 47/1, 4/154, 239/104
[51] Int. Cl. .............................................. B05b 1/28
[58] Field of Search ....... 239/104, 122; 4/149, 154 S; 135/5, 5 B; 47/20–21; 150/2.9; 56/329; 43/7, 11, 133

[56] References Cited

UNITED STATES PATENTS

| | | |
|---|---|---|
| 948,579 | 2/1910 | Nickell ........................ 56/239 |
| 3,206,892 | 9/1965 | Telkes et al. ................. 47/29 |
| 633,528 | 9/1899 | Morris .......................... 47/21 |
| 1,049,714 | 1/1913 | Herscovitz .................. 4/154 |
| 1,126,426 | 1/1915 | Eddy ............................ 47/21 |
| 1,159,810 | 11/1915 | Tokaji ........................ 56/329 |

*Primary Examiner*—Robert E. Bagwill
*Attorney*—John J. McAleese, Jr.

[57] ABSTRACT

An assembly for use in removing dirt, film, refuse, and other foreign matter from the leaves of plants which includes a curtain impervious to liquid, which curtain has an adjustable lower end portion and which is fastened to a frame.

2 Claims, 3 Drawing Figures

PATENTED AUG 8 1972

3,681,872

INVENTOR
JAMES F. LEITCH

BY Synnestvedt & Lechner
ATTORNEYS

PLANT SHOWER CURTAIN ASSEMBLY

This invention relates to an assembly for use when a plant, natural or artificial, is being showered or cleaned, particularly indoors.

Dirt, a film, or refuse upon the leaf of a plant is unsightly. It tends to destroy the intrinsic beauty of the plant. This is so whether the plant is natural or artificial.

More importantly, in respect of a natural plant, the presence of dirt, a film, or refuse upon the surface of its leaves impairs, if not prevents, the breathing of the plant. This in turn causes the plant to deteriorate.

This condition may be dealt with by washing the leaves of the plant with water or with water with a chemical additive.

Washing the leaves of plants to remove dirt, a film, or refuse has been performed by hand. This may, however, defeat the purpose of the washing. When washing by hand, the membranes of the leaves of the plant may be damaged when they are handled in the course of the washing operation. In turn, the plant thus is caused to deteriorate.

It is an object of the instant invention to remove dirt, film, refuse, or other foreign material from the leaves of a plant, particularly indoors, without having to do so by hand.

A further object of this invention is to provide an assembly which permits the showering of the leaves of a plant, particularly indoors, while at the same time preventing the liquid being used in the shower from being spilled on the floor.

A further object is to provide an assembly of the kind referred to in the preceding paragraph which is effective yet simple and inexpensive to manufacture and market.

Figure 2:
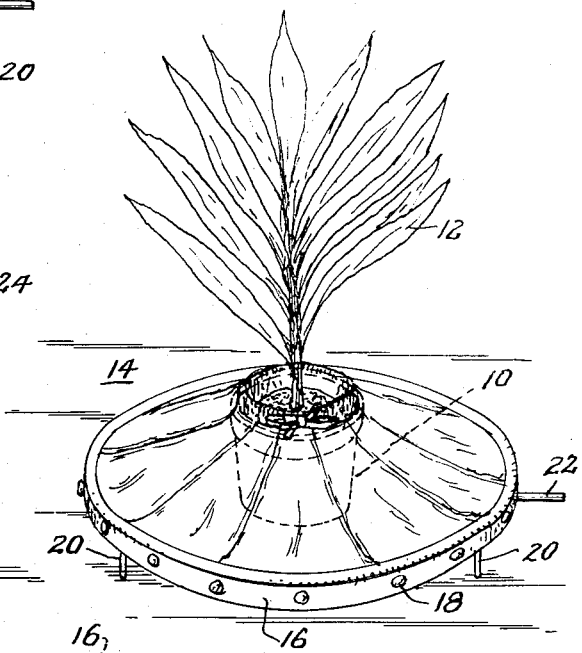
Figure 3:
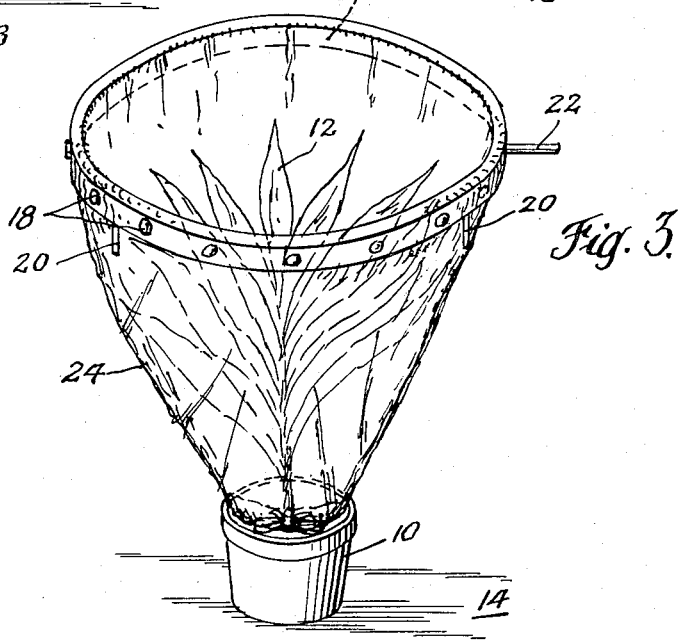

Other objects and a fuller understanding of the invention may be had by referring to the following description and claims, taken in conjunction with the accompanying drawing, in which:

FIG. 1 shows a plant shower curtain assembly according to the instant invention which has been placed over a plant and is ready to be adjusted in preparation for its use;

FIG. 2 shows the assembly shown in FIG. 1 with the lower end portion of the curtain adjusted or gathered so as to accommodate it to the particular pot in which the plant is growing; and FIG. 3 is the assembly shown in FIGS. 1 and 2 in position an adjusted for use in removing indoors dirt, film, refuse, or foreign material from the leaves of the plant by showering the leaves with water or water with a particular chemical additive.

With reference to FIG. 1 of the drawing, a pot 10 contains a plant 12. The pot 10 is shown resting on a floor 14. The pot and plant combination shown in FIG. 1 are indoors, where the invention is particularly useful.

A frame 16 has suitable snap fasteners 18 around its outer portion. The frame 16 is shown as being round, in the form of a ring or hoop, but that shape is not indispensible to the proper functioning of the assembly. The frame 16 may be constructed of any material which will impart rigidity to it.

Extending downwardly from the frame 16 are legs 20. The function of these legs will be described hereinafter. The frame 16 also has a handle 22, shown in every figure of the drawing.

The assembly includes a curtain 24. The curtain shown is made of a plastic-type material which is impervious to liquid. It was rectangular in shape, but has had the ends thereof joined together so as to make the outer and inner surfaces continuous. The curtain thus formed is itself impervious to water. It also is transparent.

It should be realized that the curtain may be made of any material that is impervious to liquid. Although it is desirable that it be transparent, even that is not indispensible. Furthermore, although the preferred embodiment includes a curtain which has openings at its top and bottom which are the same size, this is not necessary for proper functioning of the assembly.

The frame 16 is shown as having an inner surface and an outer surface. The upper end portion of the curtain 24 is fastened to the outer surface of the frame 16 by the snap fasteners 18. Although the preferred embodiment includes snap fasteners, any kind of fastening device which allows removal of the curtain would be suitable. For that matter, if removal of the curtain were not deemed desirable, then the curtain could be attached to the frame by any suitable adhesive. Also, it should be realized that the upper end portion of the curtain may be fastened or attached to the inner surface of the frame 16, or to both the inner and outer surfaces thereof.

At the lower end portion of the curtain 24 is a hem 26, shown clearly in FIG. 1. Inside this hem is a drawstring 28, shown also in FIG. 1. The hem and drawstring provide for the gathering or adjustment of the lower end portion of the curtain 24. The hem may be provided with holes at various points so that, if an end of the drawstring is moved within the hem, it readily may be retrieved.

To use the plant shower curtain assembly shown in FIGS. 1, 2, and 3, a user first makes certain that the lower end portion of the curtain 24 is open as far as it can be. This is accomplished by holding the curtain at two opposite places of the hem 26 and pulling outwardly. Both ends of the drawstring 28 must be protruding from the hem 26, as shown in FIG. 1.

A person using the assembly next grasps the handle 22, raises the frame 16 to such a height that the lower end portion of the curtain is above the top of the plant 12, places the assembly above the plant 12, and then lowers it into the position shown in FIG. 1. The frame 16 then is lowered to an placed upon the floor 14, and the lower end portion is tucked within the inside of the pot 10. The drawstring 28 is pulled and tied so that the diameter of the lower end portion of the curtain, gathered as it is, is less than the diameter of the pot 10. Wen this is completed, the assembly will appear as it does in FIG. 2.

Again, the handle 22 is grasped, and the frame 16 is raised to a position above the plant 12, as is shown in FIG. 3.

Now, the plant may be showered. This may be accomplished with a hose attached to an ordinary water tap. Even a spray bulb may be used. Showering should take place working from the top of the plant down. As showering progresses, the frame is progressively lowered. For optimum operation, the frame should always remain above the level of the leaves currently being washed.

When showering is completed, the hose is turned off, and the frame 16 is lowered to the floor 14. The assembly positioned on the floor is illustrated in FIG. 2. It may be observed that the legs 20 position the frame 16 above the floor level. This, together with the curtain 24, creates a trough to contain both the water which has adhered to the inside of the curtain 24 following the showering operation and the water which at first drips from the leaves of the plant 12 after washing. After the leaves stop dripping, the frame 16 is raised again to the position shown in FIG. 1. This will release the water previously contained in the trough referred to above, and a large portion of the water still remaining on the inside of the curtain 24. Thereafter, the frame 16 is returned to the floor, the drawstring 28 is untied, and the curtain assembly is carefully removed from around the pot and plant.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A plant shower curtain assembly comprising a frame having an inner surface and an outer surface and having legs extending downward therefrom wherein said frame is a ring, a curtain having an upper end portion and a lower end portion, the upper end portion of which is in contact with substantially all of one of said surfaces and being fastened thereto, said curtain extending downwardly from said frame and being impervious to liquid, and means for gathering said curtain located at the lower end portion thereof, wherein said means comprises a hem formed at the lower end portion of said curtain and a drawstring positioned within said hem.

2. A plant shower curtain assembly according to claim 1 wherein said curtain is transparent.

* * * * *